United States Patent
Connor et al.

(10) Patent No.: US 8,460,215 B2
(45) Date of Patent: Jun. 11, 2013

(54) SYSTEMS AND METHODS FOR PREDICTING POTENTIALLY DIFFICULT INTUBATION OF A SUBJECT

(75) Inventors: Christopher W. Connor, Arlington, MA (US); Scott Segal, Chestnut Hill, MA (US)

(73) Assignee: The Brigham and Women's Hospital, Inc., Boston, MA (US)

(*) Notice: Subject to any disclaimer, the term of this patent is extended or adjusted under 35 U.S.C. 154(b) by 273 days.

(21) Appl. No.: 12/795,829

(22) Filed: Jun. 8, 2010

(65) Prior Publication Data
US 2010/0312144 A1 Dec. 9, 2010

Related U.S. Application Data

(60) Provisional application No. 61/185,039, filed on Jun. 8, 2009.

(51) Int. Cl.
*A61B 5/103* (2006.01)
*A61B 5/107* (2006.01)

(52) U.S. Cl.
USPC . 600/587; 600/300; 128/200.26; 128/207.14; 128/207.15; 382/118; 382/217

(58) Field of Classification Search
USPC ............... 600/300, 587; 128/200.26, 207.14, 128/207.15; 382/118, 217
See application file for complete search history.

(56) References Cited

U.S. PATENT DOCUMENTS

| 7,954,251 | B2* | 6/2011 | Nunes et al. | 33/514 |
| 2009/0116749 | A1* | 5/2009 | Cristinacce et al. | 382/195 |
| 2010/0063384 | A1* | 3/2010 | Kornblau et al. | 600/424 |
| 2010/0172550 | A1* | 7/2010 | Gilley et al. | 382/118 |

OTHER PUBLICATIONS

The Complications of Tracheal Intubation, Victor Faria Blanc, Anesthesia and Analgesia, vol. 53, No. 2, Mar.-Apr. 1974.*
Naguib, Mohamed, et al., Predictive Models for Difficult Laryngoscopy and Intubation. A Clinical, Radiologic and Three-Dimensional Computer Imaging Study, Can J Anesth, 1999, 46:8, pp. 748-759.
Suzuki, Noriko, et al., Submandible Angle in Nonobese Patients with Difficult Tracheal Intubation, Anesthesiology, 2007, 106:916-23.

* cited by examiner

*Primary Examiner* — Sean Dougherty
(74) *Attorney, Agent, or Firm* — Quarles & Brady, LLP

(57) ABSTRACT

Systems and methods for predicting potential difficult intubation of a subject acquire, using a facial structure analysis system, facial structure data of the subject. The systems and methods also extract, using facial structure analysis software of the facial structure analysis system, at least one facial structure variable value from the facial structure data and obtain a predicted potential difficult intubation value using an airway classification model and the at least one facial structure variable value. The systems and methods generate a report based on the predicted potential difficult intubation value.

18 Claims, 8 Drawing Sheets

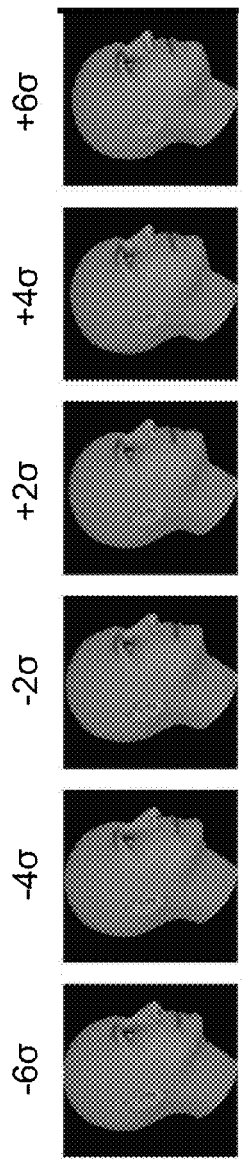 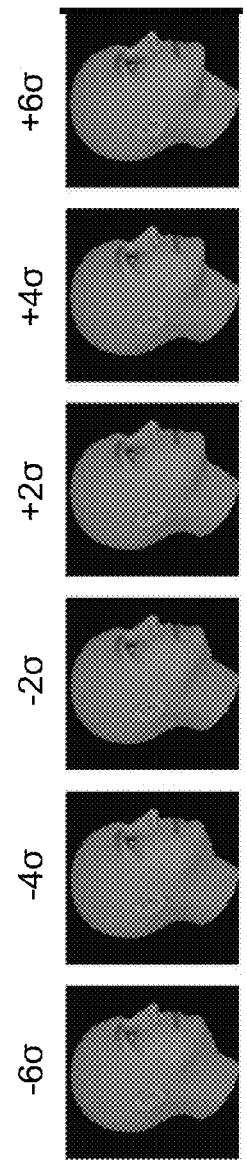 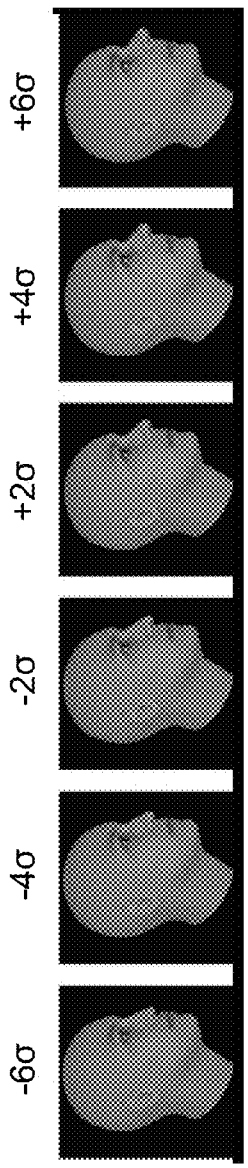

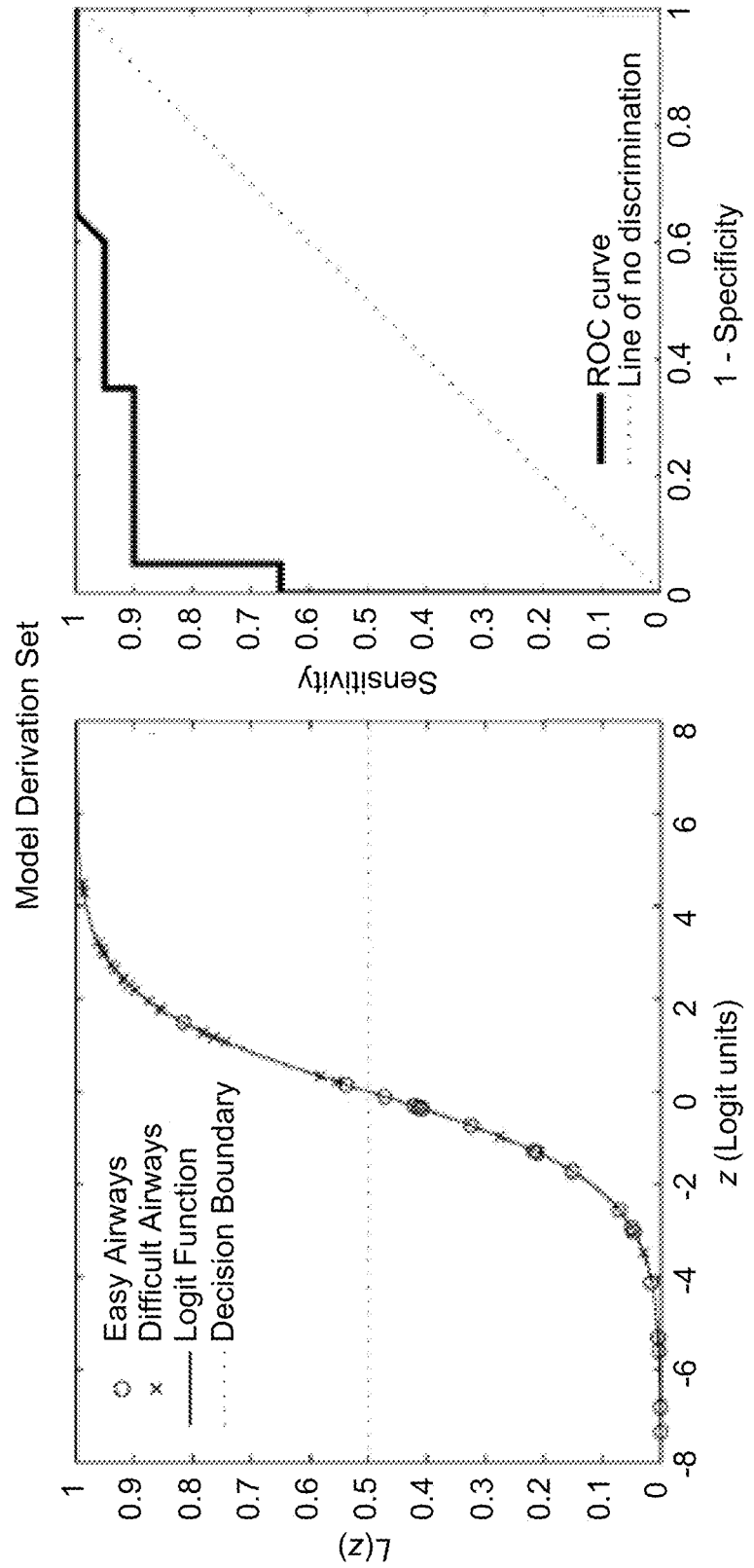

SYSTEMS AND METHODS FOR PREDICTING POTENTIALLY DIFFICULT INTUBATION OF A SUBJECT

CROSS-REFERENCE TO RELATED APPLICATIONS

This application claims the benefit of U.S. Provisional Patent Application No. 61/185,039, filed Jun. 8, 2009, the disclosure of which is hereby incorporated by reference in its entirety.

STATEMENT OF FEDERALLY SPONSORED RESEARCH OR DEVELOPMENT

Not applicable.

BACKGROUND OF THE INVENTION

The present invention is directed to systems and methods for analyzing anatomical structures of a subject and, more particularly, to systems and methods for determining and predicting potentially difficult intubation of an anesthetized subject.

Subjects undergoing medical procedures that require general anesthesia are ventilated using endotracheal intubation and/or face mask techniques. Unfortunately, intubation difficulty varies between subjects, and multiple failed intubation attempts can result in hypoxia or even death. As such, subjects are pre-operatively examined for anatomic features that are believed to indicate difficult intubation. Typically, at least two examinations are used. One examination is the Mallampati or "MP" test, which involves an examination of oropharyngeal structures that are visible when the seated subject maximally opens the mouth and extends the tongue without phonation, such as described in Mallampati, S. R. et al. Can. Anaesth. Soc. J. 1985; 32: 429-34 and Samsoon, G. L. et al. Anaesthesia 1987; 42: 487-90, which is incorporated herein by reference. Specifically, the subject receives a grade of I through IV, corresponding to an "easy-to-intubate" through "difficult-to-intubate" indication, based on the visibility of some oropharyngeal structures, such as the uvula, compared to other structures, such as the hard palate. The other examination involves measuring the thyromental distance or "TMD" of the subject. The TMD is the distance between the top of thyroid cartilage and the inside of the tip of the mandible with the head in a neutral position, such as described by Frerk, C. M. Anaesthesia 1991; 46: 1005-8 and incorporated herein by reference. Generally, a subject having a TMD less than three fingerbreadths is considered difficult to intubate.

Unfortunately, both of the above tests perform only modestly, with a sensitivity of 30-60 percent, specificity of 60-80 percent, and positive predictive value of just 5-20 percent, as described by Shiga, T. et al. Anesthesiology 2005; 103: 429-37 and incorporated herein by reference. As such, other methods for predicting difficult intubation have been created. For example, Suzuki et al. described in Anesthesiology 2007; 106: 916-23 the use of photographs of subjects' faces to calculate five ratios and angles from measurements derived from placement of anatomic markers on the photographs. The "submandibular angle" was found to correlate with difficult intubation. As another example, Naguib et al. described in Can. J. Anaesth. 1999; 46: 748-59 the measurement of 22 indices from plain radiographs and eight indices from three-dimensional computed tomography scans of the head of subjects who were easy or difficult to intubate. This data was used to create a model including the bedside tests of MP evaluation, TMD evaluation, and thyrostemal distance measurement, and two radiographic features that accurately separated easy- and difficult-to-intubate cohorts.

Both of these previous investigations used a priori assumptions of which anatomic features might correlate with difficult intubation. As such, these investigations may ignore anatomic features that have a non-intuitive correlation with difficult intubation and can lead to faulty indications upon which medical decisions are based.

Therefore, it would be desirable to have methods and systems for predicting potentially difficult intubation that are based on an unbiased investigation to thereby provide a more accurate indication of the potential difficulty of intubating an individual and allow clinicians to make more accurate medical treatment decisions.

SUMMARY OF THE INVENTION

In a first aspect, the present invention provides a method for predicting potential difficult intubation of a subject that includes acquiring, using a facial structure analysis system, facial structure data of the subject, extracting, using facial structure analysis software of the facial structure analysis system, at least one facial structure variable value from the facial structure data, and obtaining a predicted potential difficult intubation value by evaluating an airway classification model using the at least one facial structure variable value. The method also includes generating a report based on the predicted potential difficult intubation value.

In another aspect, the present invention provides a method for predicting potential difficult intubation of a subject that includes acquiring, using a facial structure analysis system, facial structure data from the subject and extracting at least three facial structure variable values from the facial structure data. The at least three facial structure variable values include a face—brow-nose-chin ratio, a jaw—neck slope high/low value, and a nose—tilt down/up value. The method also includes measuring the thyromental distance of the subject and obtaining a predicted potential difficult intubation value by evaluating an airway classification model using the at least three facial structure variable values and the thyromental distance. The method further includes generating a report providing an easy-to-intubate indication if the predicted potential difficult intubation value is at least less than a threshold value and providing a difficult-to-intubate indication if the predicted potential difficult intubation value is greater than the threshold value.

Other aspects of the invention will be apparent from the following description and the claims.

BRIEF DESCRIPTION OF THE DRAWINGS

The invention will hereafter be described with reference to the accompanying drawings, wherein like reference numerals denote like elements, and:

FIGS. 4a-4c show variations of facial structure variables that have been found to discriminate between easy-to-intubate and difficult-to-intubate subjects;

FIGS. 7a-7f show graphs of classification and statistical behavior of an airway classification model used by the system of FIG. 1;

DETAILED DESCRIPTION OF THE INVENTION

The present invention generally provides systems and methods for predicting potentially difficult intubation of a subject. In general, this prediction is based on the analysis of images of the subject using a model derived using an unbiased investigation. Specifically, the model considers several specific facial structures, in addition to the thyromental distance (TMD), that are used to best discriminate between easy-to-intubate and difficult-to-intubate subjects. In the following paragraphs, the systems and methods of the present invention are first described. Thereafter, the aforementioned research basis is described and example results obtained using the method are provided.

Systems and Methods

Figure 1:
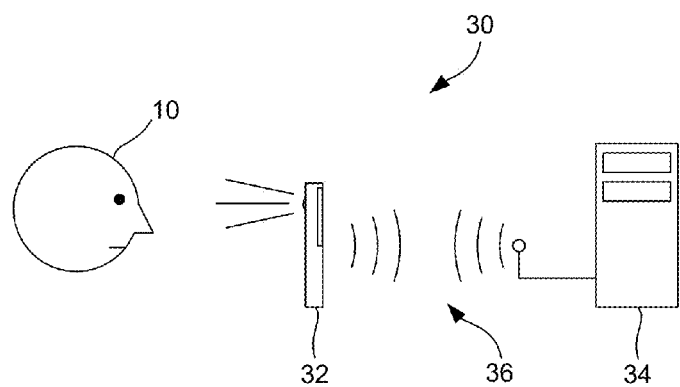
FIG. 1 is a schematic diagram of a facial structure analysis system according to the present invention.
Figure 2A:
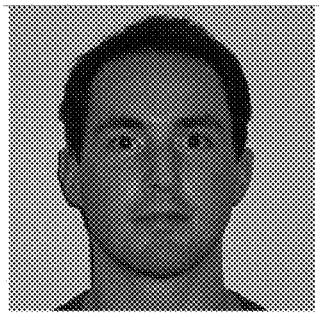
FIGS. 2a-2c show exemplary still images of a subject obtained by the system of FIG. 1.
Figure 2B:
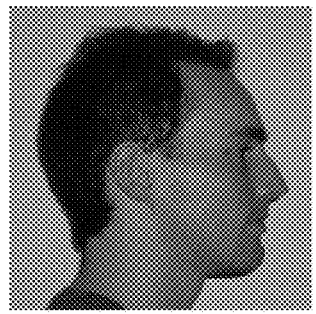
Figure 2C:
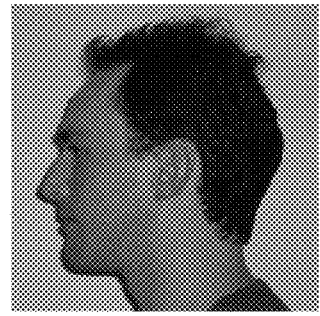

Referring to FIG. 1, the present invention provides a facial structure analysis system 30 including a data input device 32, such as an electronic mobile device (e.g., a cellular phone). The data input device 32 is capable of acquiring still photographic images that include facial structure data of a subject 10 (e.g., pixels representing the subject's facial structures). Examples of appropriate still images are shown in FIGS. 2a-c and preferably include at least a frontal view of the head of the subject 10 (FIG. 2a) and one or more profile views of the head of the subject 10 (FIGS. 2b and 2c). It should be noted that the images also preferably include neck structure data of the subject 10; however, for simplicity, only the term "face" and variations thereof (e.g., "facial") are used herein to describe a subject's face preferably in addition to the subject's neck. In addition to acquiring still photographic images, the data input device 32 may also be capable of receiving the TMD of the subject 10, which may be measured and input manually (e.g., via the cellular phone's keypad).

Figure 3:
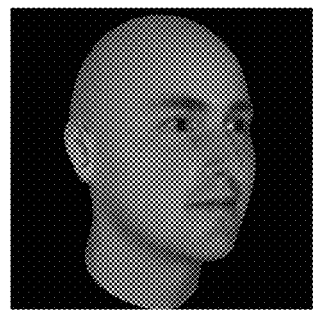
FIG. 3 shows a rendering of the subject of FIGS. 2a-2c based on extracted facial structure variable values.

The data input device 32 sends the images and TMD of the subject 10 to a processor 34 (e.g., a remote server) via, for example, a wireless data network connection, generally indicated by arrow 36. The processor 34 evaluates the images using facial structure analysis software, such as FaceGen Modeller v3.3 by Singular Inversions of Toronto, Canada. The software evaluates the images and extracts values for facial structure variables of the subject. These facial structure variable values can be used for several purposes, such as creating a complete rending of the subject's face, as shown in FIG. 3. In the present case, the processor 34 uses the facial structure analysis software to obtain values for several specific facial structure variables. Several photographs illustrating different values of these facial structure variables are shown in FIGS. 3a-3c and include a face—brow-nose-chin ratio (FIG. 3a), a jaw—neck slope high/low value (FIG. 3b), and a nose—tilt down/up value (FIG. 3c). The processor 34 obtains these specific variables because, briefly, the systems and methods described below evaluated the facial structures of both easy-to-intubate and difficult-to-intubate subjects and found that these variables, in addition to TMD, best discriminate between the two types of subjects.

Including the three variables described above, a total of 61 variables can be used to completely describe a subject's face. These variables are listed below in Table 1.

TABLE 1

61 variables used to describe the overall structure of a subject's face. Those emphasized discriminate between easy and difficult intubation, and those marked with an asterisk are evaluated by the system to predict potentially difficult intubation.
Observable Facial Structure Variables

| | |
|---|---|
| Brow Ridge - high/low | Jaw - retracted/jutting |
| Brow Ridge Inner - down/up | Jaw - wide/thin |
| Brow Ridge Outer - up/down | *Jaw - neck slope high/low |
| Cheekbones - low/high | Jawline - concave/convex |
| Cheekbones - shallow/pronounced | Mouth - drawn/pursed |
| Cheekbones - thin/wide | Mouth - happy/sad |
| Cheeks - concave/convex | Mouth - lips deflated/inflated |
| Cheeks - round/gaunt | Mouth - lips large/small |
| Chin - forward/backward | Mouth - lips puckered/retracted |
| Chin - pronounced/recessed | Mouth - lips thin/thick |
| Chin - retracted/jutting | Mouth - protruding/retracted |
| Chin - shallow/deep | Mouth - tilt up/down |
| Chin - small/large | Mouth - underbite/overbite |
| Chin - tall/short | Mouth - up/down |
| Chin - wide/thin | Mouth - wide/thin |
| Eyes - down/up | Mouth - chin distance - short/long |
| Eyes - small/large | Nose - bridge shallow/deep |
| Eyes - tilt inward/outward | Nose - bridge short/long |
| Eyes - apart/together | Nose - down/up |
| *Face - brow-nose-chin ratio | Nose - flat/pointed |
| Face - forehead-sellion-nose ratio | Nose - nostril tilt down/up |
| Face - heavy/light | Nose - nostrils small/large |
| Face - round/gaunt | Nose - nostrils wide/thin |
| Face - tall/short | Nose - region concave/convex |
| Face - up/down | Nose - sellion down/up |
| Face - wide/thin | Nose - sellion shallow/deep (1) |
| Forehead - small/large | Nose - sellion shallow/deep (2) |
| Forehead - tall/short | Nose - sellion thin/wide |
| Forehead - tilt forward/back | Nose - short/long |
| Head - thin/wide | *Nose - tilt down/up |
| | Temples - thin/wide |
| *Thyromental Distance (TMD) | Mallampati Test (MP) |

In some embodiments, the software may extract values for a different combination of facial structure variables than those described above. This could be the case if the definition of a difficult-to-intubate subject is modified from that described below. Briefly, the definition could be modified to exclude subjects that would traditionally be considered only marginally difficult to intubate, or the definition could be modified to exclude all subjects except those that would traditionally be considered very difficult to intubate. In both of these cases, a different combination of facial structure variables could provide the best prediction of potentially difficult intubation.

Regardless of the facial structure variables that are evaluated, the software preferably obtains and expresses the facial structure variable values as "eigenface" values. The eigenface method is similar to describing the complete structure of a subject's face as individual facial structure variables like those above listed in Table 1. However, some of the 61 variables in Table 1 are interdependent, and the eigenface method uses a linear transform to express the 61 variables as 50 independent eigenfaces. As such, the eigenface method allows the overall structure of a subject's face to be represented as a point in a 50-dimensional space. Furthermore, the software preferably provides an improvement to the eigenface method in which weightings applied to the eigenfaces are specified in terms of the 61 facial structure variables expressed as standard deviations from an androgynous normal derived from a reference population of subjects. An example of this weighting is illustrated in FIGS. 4a-4c; these images differ from the androgynous normal by negative six through positive six times the facial structure variable standard deviations of the reference population. Further details of the eigenface method are described in Turk, M. et al. Journal of Cognitive Neuroscience 1991; 3: 71-86, Valentine, T. Q. J. Exp. Psychol. A. 1991; 43: 161-204, and Chen, T. G. et al. 2004 ACM International Conference Proceedings Series 62:65-72, the disclosures of which are hereby incorporated by reference in their entirety.

After the software obtains the eigenface-transformed facial structure variable values, the processor 34 inputs the values into an "airway classification" or "difficult-intubation-prediction" model. This model has the form:

$$L(z) = \frac{1}{1+e^{-z}}, \text{ in which } z = \beta_0 - \left(\sum_{i=1}^{4} \varsigma_i \frac{(x_i - \alpha_i)^2}{2\sigma_i^2}\right);$$

where $x_i$ represents the transformed facial structure variable values described above, specifically $x_1$ includes the face—brow-nose-chin ratio, $x_2$ includes the jaw—neck slope high/low value, $x_3$ includes the nose—tilt down/up value, and $x_4$ is the TMD. The other parameters of the prediction model are listed below in Table 2.

TABLE 2

Parameters of the airway classification model.

| Variable x | α | σ | ς |
|---|---|---|---|
| Face - brow-nose-chin ratio | 2.995 | 2.417 | +1 |
| Jaw - neck slope high/low value | −13.683 | 3.255 | +1 |
| Nose - tilt down/up value | 0.557 | 0.735 | +1 |
| Thyromental distance (fingerbreadths) | 2.032 | 0.738 | +1 |
| Greatest modeled difficulty (logit units) | $\beta_0 = 10.85$ | | |

The rationale for creating this type of model and the steps for deriving the parameters listed in Table 2 are described in further detail below.

The output of the airway classification model, L(z), or the predicted potential-difficult-intubation value, is within a range of zero to one and is the predicted likelihood of a subject being difficult to intubate. Conversely, the value of (1−L(z)) is the predicted likelihood of a subject being easy-to-intubate. Therefore, if L(z) is less than or equal to a threshold value of 0.5 the subject is evaluated as easy-to-intubate. If L(z) is greater than 0.5, the subject is evaluated as difficult-to-intubate. However, it should be noted that the value of L(z) does not indicate the degree of intubation difficulty because, as described in further detail below, the initial protocol only considers whether or not subjects are difficult to intubate, not how difficult subjects are to intubate. Furthermore, such a degree of intubation difficulty cannot often be readily defined because, among other reasons, an anesthesiologist can select one of several alternative intubation approaches after determining that a subject is difficult to intubate. The alternative approach may be selected for various reasons, including the anesthesiologist's experience, and therefore using different approaches for different subjects does not necessarily imply that one subject is more difficult to intubate than the other subject.

After obtaining the potential-difficult-intubation value (i.e., L(z)), the processor 34 sends a message to the data input device 32 (e.g., SMS, e-mail, or the like) indicating whether the subject should be considered easy-to-intubate or difficult-to-intubate. In some embodiments, the message could include further detail about the results evaluation. For example, the message could indicate a high probability of the subject being difficult-to-intubate if the potential difficult intubation value is greater than, for example, 0.9. Conversely, the message could indicate a high probability of the subject being easy-to-intubate if the potential difficult intubation value is less than, for example, 0.1.

Figure 5:
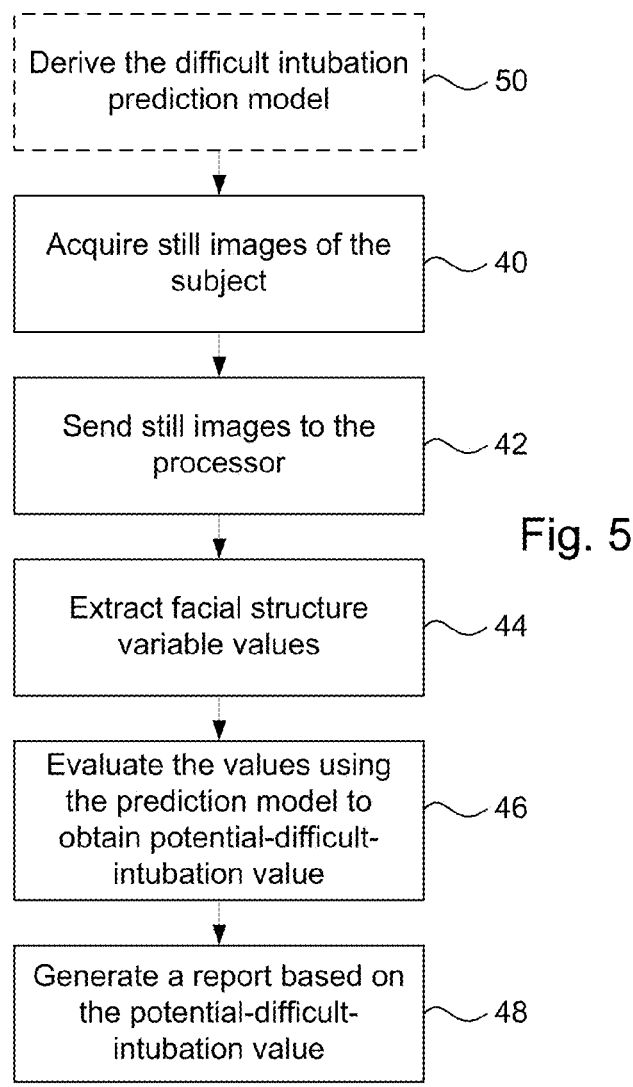
FIG. 5 is a flow chart for predicting potentially difficult intubation of a subject according to the present invention.

Referring now to FIG. 5, a method performed with the assistance of the facial structure analysis system 30 can be summarized as follows. First, a medical practitioner (e.g., an anesthesiologist) acquires still images of the subject's face using the data input device 32 in addition to measuring and entering the subject's TMD at process block 40. The data input device 32 then sends the still images and the TMD of the subject 10 to the processor 34 at process block 42. Next, the processor 34 uses the facial structure analysis software to extract values for the facial structure variables described above at process block 44. The processor 34 then obtains the potential difficult intubation value using the airway classification model and the extracted facial structure variable values and the TMD at process block 46. Finally, the processor 34 generates a report (e.g., SMS, e-mail, or the like) indicating if the subject should be considered easy to intubate or difficult to intubate and sends the report to the electronic mobile device 32 at process block 48.

The above systems and methods may be modified without departing from the scope of the invention. For example, instead of using the FaceGen Modeller software, the system 30 may use a simplified version thereof to predict difficult intubation more quickly. That is, FaceGen Modeller typically requires about 15 minutes to extract the facial structure variable values described above. A simplified version of the program that only extracts several variable values (e.g., the face—brow-nose-chin ratio, the jaw—neck slope high/low value, and the nose—tilt down/up value) requires significantly less processing time. In addition, such a simplified program may be incorporated directly into a cellular phone application. As another alternative, the processor 34 could be trained to automatically determine the TMD of the subject 10. However, the TMD may still be measured manually for subjects that require physical palpation to reveal the thyroid cartilage and the mentum. As yet another alternative, the data input device 32 could be a compact digital camera, and still images of a subject could be transferred to a desktop computer via a data cable. The desktop computer could evaluate the still images using the facial structure analysis software, or the desktop computer could send the images to a remote server for analysis. As yet another alternative and referring to FIG. 5, the method may also include a preprocessing step 50 of deriving an airway classification model having additional or different variables and parameter values than those described above. Variations to the methods described below could provide such an alternative airway classification model. Further modifications to the above systems and methods may also be used without departing from the scope of the invention.

Derivation of the Prediction Model and Example

The following paragraphs describe the aforementioned research in further detail as well as the rationale for selecting the form of the classification model. Results obtained by applying the prediction model to a validation cohort of subjects are also provided.

Materials and Methods

In accordance with prior definitions of easy intubation (see Mallampati et al., supra), subjects were defined as easy to intubate if their anesthetic record described a single attempt with a Macintosh 3 blade resulting in a grade I laryngoscopic view (i.e., full exposure of the vocal cords) (Cormack, R. S. et al. Anaesthesia 1984; 39: 1105-11). Difficult intubation was defined by at least one of: a) more than one attempt by an operator with at least six months anesthesia experience; b) grade III or IV laryngoscopic view on a four-point scale (see Cormack et al., supra); c) need for a second operator; and d) non-elective use of an alternative airway device such as a bougie, fiberoptic bronchoscope or intubating laryngeal mask airway. Subjects who were neither easy nor difficult by these criteria were not recruited. Suitable subjects were recruited post-operatively once they had adequately recovered from the effects of anesthesia.

Data Acquisition

A total of 80 subjects were recruited in order to populate four subject cohorts, as shown in Table 3.

TABLE 3

Assignment of easy-to-intubate and difficult-to-intubate subjects to investigation cohorts for derivation and validation of the model.

| Number of Subjects by Cohort (Total N = 80) | Model Derivation | Model Validation |
| --- | --- | --- |
| Easy to Intubate | 20 | 20 |
| Difficult to Intubate | 20 | 20 |

Digital photographs of the head and neck of each subject in frontal view and in left and right profiles were obtained. Subject demographics (i.e., height, weight, age, gender, type of surgery), MP, TMD (measured in fingerbreadths) and details regarding ease of intubation were obtained from the anesthetic record. Any data found to be absent from the record were collected at the time of subject enrollment.

Figure 6:
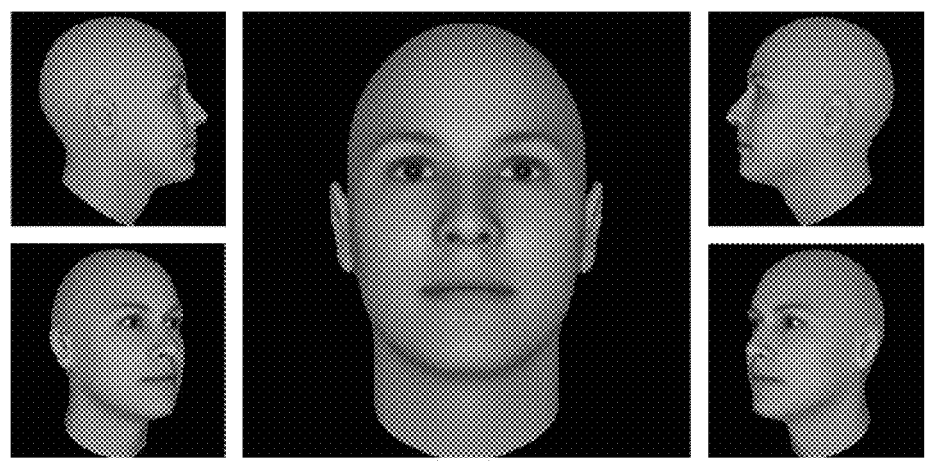
FIG. 6 shows a rendering of the average head of a reference population of subjects.
Figures 7C, 7D:
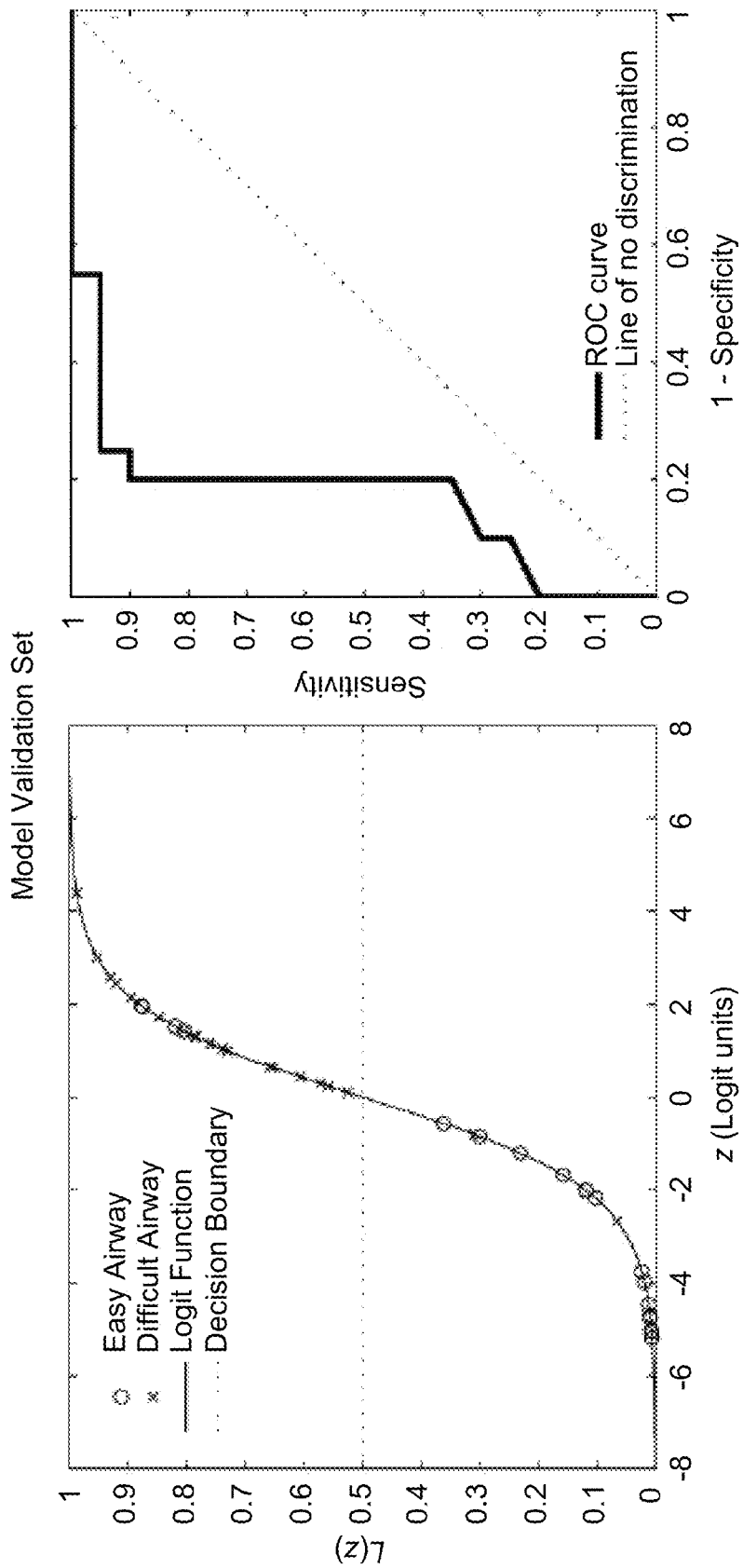
Figures 7E, 7F:
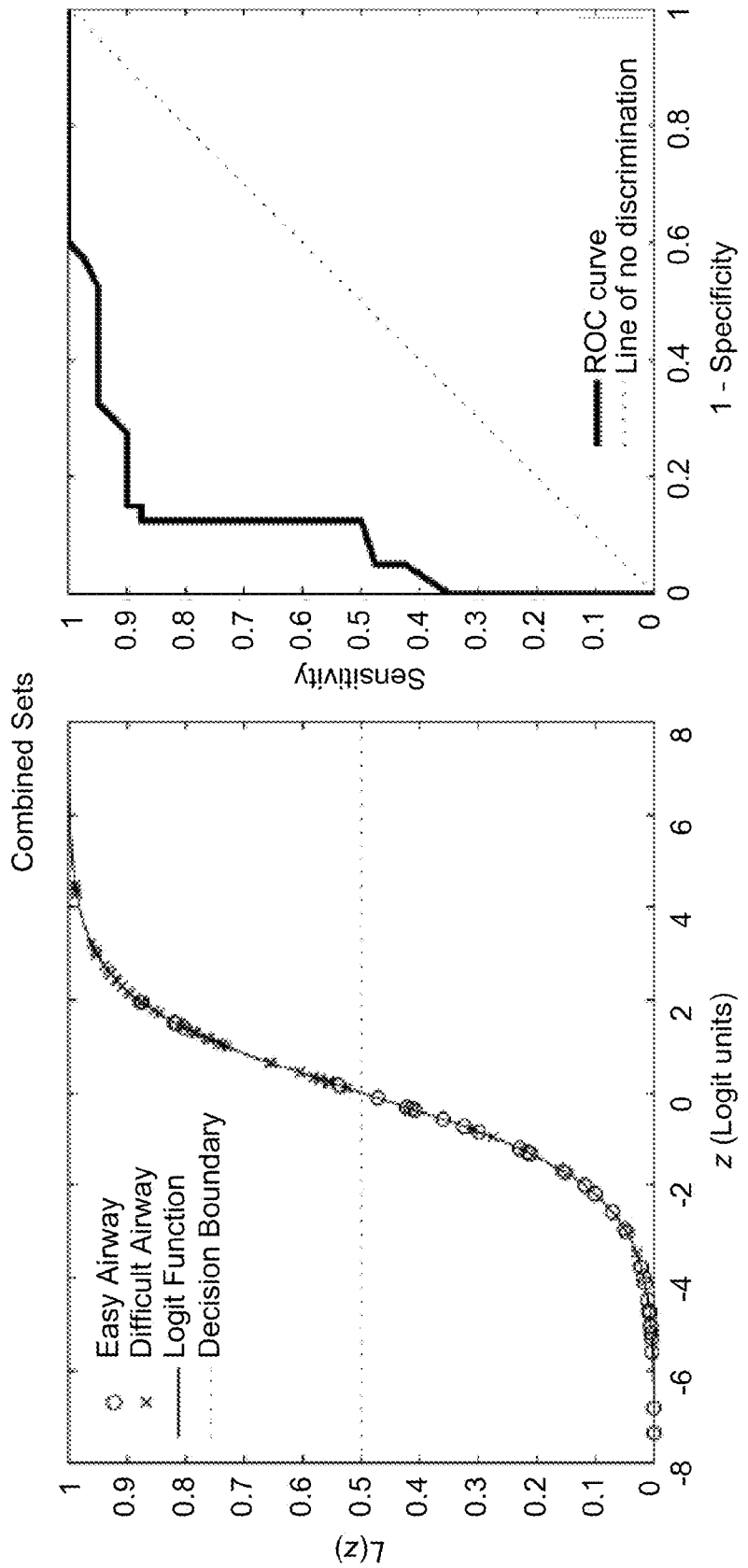

The photographs were analyzed by FaceGen Modeller facial structure analysis software. As described briefly above, this software uses an algorithm to generate a mathematical representation of the face based upon a weighted contribution of predetermined "eigenfaces", an example of which is shown in FIG. 2. The eigenface method allows the structure of any particular individual face to be expressed in an elegant and compact form (see Turk, M. et al., supra). Each of the weighting values for the eigenfaces can be considered to be a co-ordinate value, allowing the whole physiognomy of an individual face to be represented solely as a point in a 50-dimensional space (see Valentine, supra). The facial analysis software implements a further improvement to the eigenface method, such that the weightings of the eigenfaces can be specified in terms of observable facial structure variables expressed as standard deviations from an androgynous normal (FIG. 6) derived from a reference population of three hundred individuals. The above Table 1 shows the 61 observable facial structure variables used. Some of these 61 observable variables are interdependent and it can be demonstrated that this higher-dimensional representation is related directly to the underlying 50 eigenfaces by a straightforward linear transformation (see Chen et al., supra).

Statistics

Model Derivation

In this research, the task of providing a tool for predicting difficult intubation was viewed as the task of deriving an algorithm capable of separating the points representing the cohort of easy subjects from those representing the cohort of difficult subjects within a defined variable space. Subjects who were easy to intubate were assigned a classification value of zero, and difficult-to-intubate subjects were assigned a value of one. All 61 variables and the physical properties of MP and TMD were subjected to variable reduction by univariate analysis at P>0.1 ($\chi_2$ distribution, $G_2$ goodness-of-fit statistic) (Hosmer, D. W. et al. Stat. Med. 1997; 16: 965-80). The resulting variables that individually show a statistical trend in discrimination between easy and difficult intubation are shown emphasized in Table 1 and were used as a subset to derive the predictive model. Binomial logistic regression to segregate the easy-to-intubate and difficult-to-intubate cohorts (Weisberg, S. Applied Linear Regression, 3rd Edition, 2005) was trained exhaustively on all possible variable combinations of this reduced subset of variables using a quadratic logit (Hosmer, D. W. et al. Applied Logistic Regression, 2nd Ed. Edition, 2000).

The quadratic logit uses both the value of an input variable and its square. This type of model was chosen because it was hypothesized that factors influencing difficulty of intubation may not behave linearly, but instead be either easier or harder on both sides of a central value. As an example, it could be hypothesized that if both the small jaw length of micrognathia and the large jaw length of acromegaly suggest difficulty, then ease of intubation may be optimum at some middle value and fall away on either side thereof. The quadratic logit permits this type of model, whereas a linear logit does not. Furthermore, use of the quadratic logit does not rule out that a linear relationship may be found; the fitting of the quadratic logit may produce a curve that is locally straight over the region of interest.

Hence, using only data taken from the total of 40 subjects in the model derivation cohorts, each variable of the reduced subset and its square were used as inputs to a logit function in all possible combinations of inclusion or non-inclusion. The coefficients of these logits were optimized to produce candidate prediction models. The Area Under the Curve (AUC) of the Receiver Operating Characteristic (ROC) of each candidate model was calculated (Hanley, J. A. et al. Radiology 1982; 143: 29-36) and stored as $AUC_{derivation}$ for that candidate model. It has been demonstrated that models optimized for AUC rather than raw accuracy are more robust with regard to future data (Huang, J. et al. IEEE Transactions on Knowledge and Data Engineering 2005; 17: 299-310).

Model Validation

Model validation was used to avoid selecting a candidate model over-fitted to the derivation dataset. The candidate prediction models produced in the above model derivation stage were applied without further adjustment to the data taken from the 40 subjects in the model validation cohorts, producing an $AUC_{validation}$ for each candidate model. The final prediction model was chosen as the candidate model with the maximum value of ($AUC_{derivation} \times AUC_{validation}$). This method excludes models that show evidence of over-fitting, a problem with large variable spaces. That is, AUC product maximization creates a measure in which any apparent over-fitting is turned into a penalty. The sensitivity and specificity of the final model were calculated. The P value of the model was determined by its classification accuracy (exact binomial distribution) and the Bonferroni correction for multiple tests was applied using Matlab by The Mathworks of Natick, Mass.

Facial Structure Test-Retest Validation

The facial structure analysis software requires some user interaction in order to place certain fiducial markers on the images to guide reconstruction. Ten subjects were selected at random from the total of eighty investigation subjects and their photographs were re-rendered into three-dimensional models in order to test the reproducibility of the reconstruction process. A correlation coefficient of r=0.80 was established across the 61 variables, indicating a high degree of reproducibility.

Results

Of the 61 observable facial proportions and the physical properties of MP and TMD, 11 showed a univariate statistical trend in discriminating between easy and difficult intubations. These 11 variables, shown emphasized in Table 1, were evaluated as possible inputs to the model, producing a total of $2^{11}-1=2047$ candidate models. The final predication model was chosen by AUC product maximization and found to depend on only three observable facial proportions in addition to TMD, as marked with asterisks in Table 1. The numerical parameters of the model are provided above in Table 2. In the following paragraphs, the clinical performance of the model is first discussed before considering its mathematical details.

Clinical Interpretation of the Model

FIGS. 7a-7f show the classification and statistical behavior of the model when applied to the model derivation dataset, the validation dataset, and the two datasets combined. The model successfully clusters easy-to-intubate and difficult-to-intubate subjects towards opposite ends of the logit curve (see FIGS. 7a, 7c, and 7e). ROC curves were constructed for each test population and are shown adjacent to the classification behavior (see FIGS. 7b, 7d, and 7f). Table 4 contains the numerical representations of these statistical properties.

TABLE 4

Statistical performance measures for the final prediction model.

| Statistical Properties | Derivation Set | Validation Set | Combined |
| --- | --- | --- | --- |
| Sensitivity | 0.9 | 0.9 | 0.9 |
| Specificity | 0.9 | 0.8 | 0.85 |
| True Positives | 18 | 18 | 36 |
| True Negatives | 18 | 16 | 34 |
| False Positives | 2 | 4 | 6 |
| False Negatives | 2 | 2 | 4 |
| Accuracy (correct/total) | 36/40 | 34/40 | 70/80 |
| Exact Binomial Probability Test | $P = 9.29 \times 10^{-7}$ | $P = 4.18 \times 10^{-6}$ | $P = 1.58 \times 10^{-12}$ |
| Bonferroni Correction | 210 | 210 | 210 |
| Corrected Probability | $P = 9.51 \times 10^{-4}$ | $P = 4.28 \times 10^{-3}$ | $P = 1.62 \times 10^{-9}$ |

The performance of the algorithm is stated in terms of its accuracy as a binomial classifier, allowing calculation of P values according to the binomial distribution. In selecting a model based on the data, the problem of multiple comparisons must be addressed. Since a total of 11 variables participated in generation of the model, and all possible combinations of models were exhaustively evaluated, each variable participated in $2^{10}$ models. The P values remain highly significant even after application of the Bonferroni correction, the most conservative correction for multiple comparisons.

When applied to the combined dataset, the performance of the final model showed a sensitivity of 90% and a specificity of 85%. The area under the ROC curve was 89.9%. The MP test did not show a statistical trend with ease or difficulty of intubation and so did not form part of the described process of model selection. Even when MP was explicitly included into the reduced set of variables, it did not affect the final model selection and so inclusion of MP did not add further predictive information.

In order to allow comparison of the model to traditional airway assessment tools, the ability of MP and TMD evaluations to predict difficult intubation were tested against the investigation population. Table 5 shows the statistical performance of MP and TMD evaluations both alone and together when used as variables for quadratic logit models.

TABLE 5

Statistical performance measures of traditional airway assessment tools when optimized with respect to the investigation model derivation cohort.

| Statistical Properties | Mallampati Test (MP) | | Thyromental Distance (TMD) | | Bivariate Model (MP and TMD) | |
| --- | --- | --- | --- | --- | --- | --- |
| | Derivation | Validation | Derivation | Validation | Derivation | Validation |
| Sensitivity | 0.4 | 0.1 | 0.85 | 0.8 | 0.8 | 0.65 |
| Specificity | 0.85 | 0.9 | 0.5 | 0.5 | 0.7 | 0.7 |
| True Positives | 8 | 2 | 17 | 16 | 16 | 13 |

TABLE 5-continued

Statistical performance measures of traditional airway assessment tools when optimized with respect to the investigation model derivation cohort.

| Statistical Properties | Mallampati Test (MP) | | Thyromental Distance (TMD) | | Bivariate Model (MP and TMD) | |
|---|---|---|---|---|---|---|
| | Derivation | Validation | Derivation | Validation | Derivation | Validation |
| True Negatives | 17 | 18 | 10 | 10 | 14 | 14 |
| False Positives | 3 | 2 | 10 | 10 | 6 | 6 |
| False Negatives | 12 | 18 | 3 | 4 | 4 | 7 |
| Accuracy | 25/40 | 20/40 | 27/40 | 26/40 | 30/40 | 27/40 |

This comparison ascertained the maximum performance of these tests when their thresholds were allowed to be optimized against the model derivation data in the same manner used in the derivation of the new prediction model. This comparison provided the same advantage of being partially optimized against the investigation data to the traditional tools and the new model alike. The traditional tools nevertheless demonstrated substantially weaker performance than the final prediction model. Table 6 shows the performance of the MP and TMD evaluations when used in the usual clinical manner with their traditionally ascribed thresholds, without the inclusion of a squared term.

TABLE 6

Performance of traditional airway assessment tools alone and in combination when used with their commonly ascribed thresholds.

| Statistical Properties | MP ≧ 3 | TMD < 3 | MP ≧ 3 and TMD < 3 | MP ≧ 3 or TMD < 3 |
|---|---|---|---|---|
| Sensitivity | 0.25 | 0.125 | 0.05 | 0.325 |
| Specificity | 0.875 | 0.925 | 0.95 | 0.85 |
| True Positives | 10 | 5 | 2 | 13 |
| True Negatives | 35 | 37 | 38 | 34 |
| False Positives | 5 | 3 | 2 | 6 |
| False Negatives | 30 | 35 | 38 | 27 |
| Accuracy | 45/80 | 42/80 | 40/80 | 47/80 |

The performance was again inferior and the greatest achieved accuracy of 47/80 did not rise to the level of statistical significance when compared to chance (P=0.073, exact binomial distribution).

Figure 8:
FIG. 8 shows renderings of a head that is highly likely to be difficult to intubate.
Figure 9:
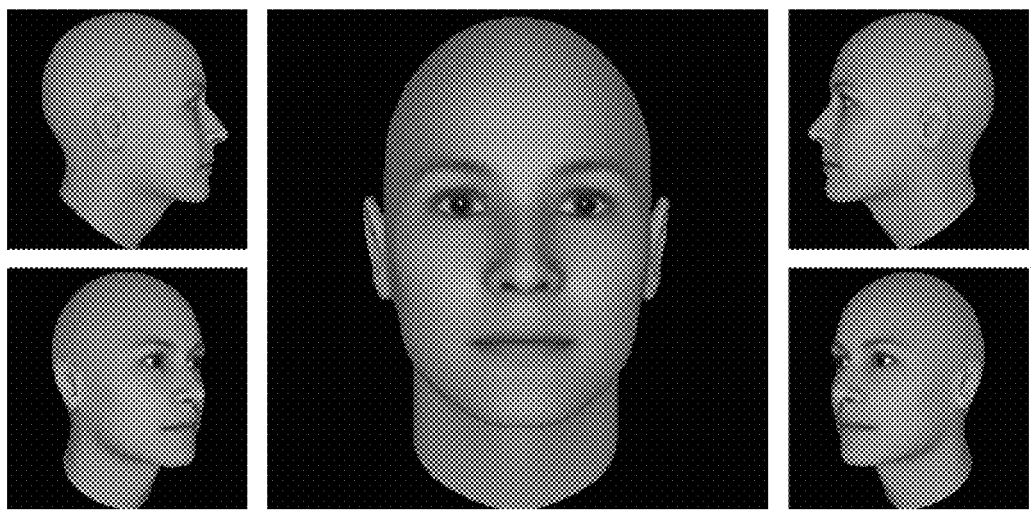
FIG. 9 shows renderings of a head that is highly likely to be easy to intubate.

As the final model describes appearance, it is possible to generate pictures of subject faces that are highly likely to be easy to intubate or difficult to intubate. FIG. 8 illustrates the head that is highly likely to be difficult to intubate according to the model. FIG. 9 illustrates a head which the model views as highly likely to be easy to intubate. The variable values for this head are set such that the output value of the model is of the same magnitude but opposite to that of FIG. 8. Therefore, FIG. 9 might be considered to represent a subject as likely to be easy to intubate as the subject in FIG. 8 is likely to be difficult to intubate.

Figure 10:
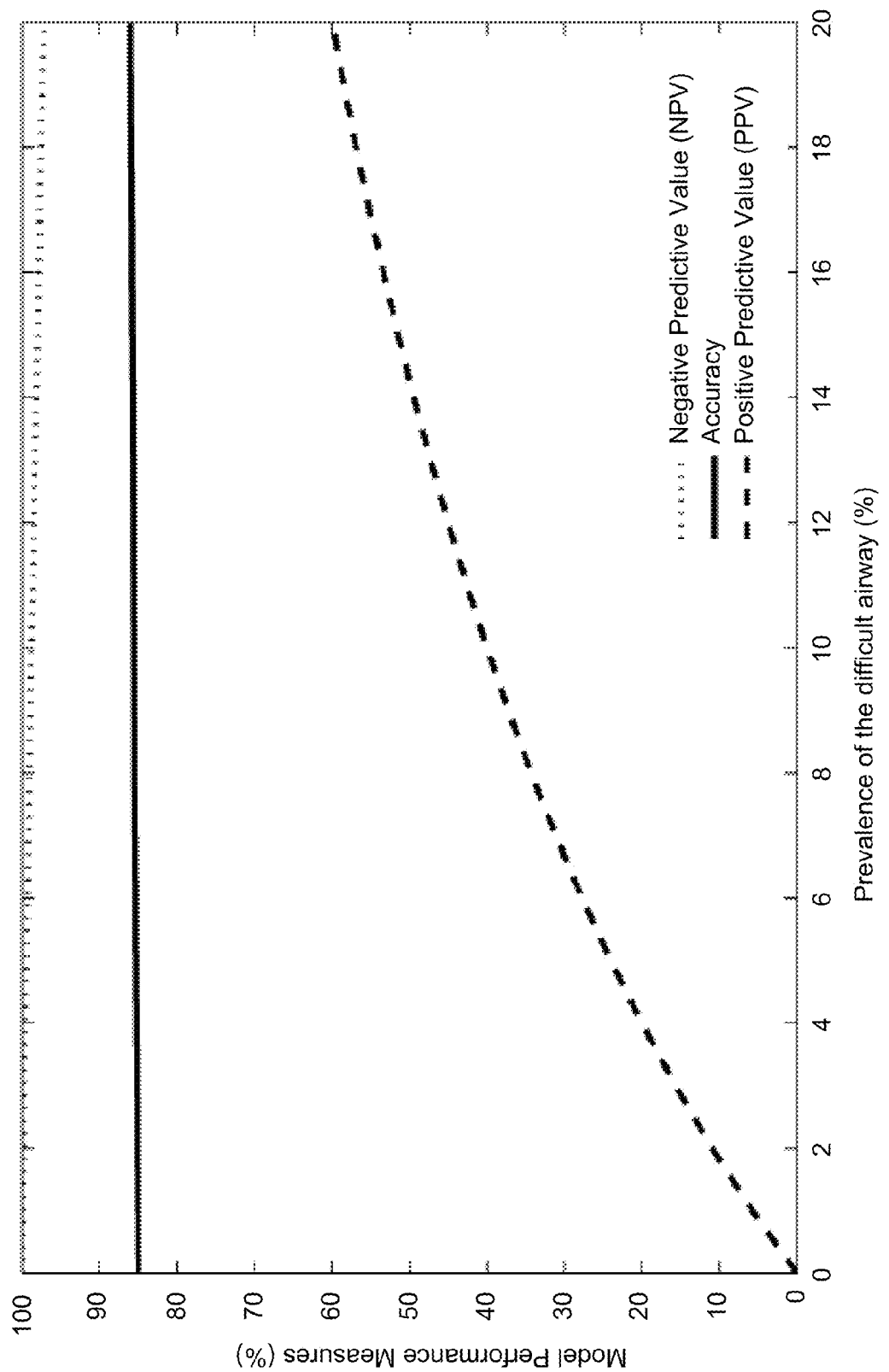
FIG. 10 shows a graph of the variation with prevalence of the negative and positive predictive values and accuracy for the airway classification model.

A positive predictive value (PPV) could not be directly calculated from this cohort investigation because the prevalence of difficult airways in the investigation was significantly enriched compared to the general population and also because the prevalence of the difficult airway in the general population is imperfectly characterized (Altman, D. G. et al. BMJ 1994; 309: 102). However, Bayes' Theorem allows the negative and positive predictive values and accuracy to be estimated for a range of a priori prevalences, as shown in FIG. 10.

Mathematical Interpretation of the Model

Table 2, above, contains the parameters of the final prediction model, defined as:

$$L(z) = \frac{1}{1+e^{-z}},$$

$$\text{in which } z = \beta_0 - \varsigma_1 \frac{(x_1 - a_1)^2}{2\sigma_1^2} - \varsigma_2 \frac{(x_2 - a_2)^2}{2\sigma_2^2} - \ldots$$

The value of $L(z)$ is always within the range of zero to one and is the predicted likelihood of belonging to class one. The value of $(1-L(z))$ is the predicted likelihood of belonging to class zero. Therefore, if $L(z)$ is less than or equal to 0.5, then the subject is predicted as belonging to class zero (i.e., being easy to intubate) and if $L(z)$ is greater than 0.5, then the subject is predicted as belonging to class one (i.e., being difficult to intubate). The respective meanings of the parameters of the model are simply described as follows. In the quadratic logit model, the $\alpha$ terms identify the apex of the quadratic curve, and the $\sigma$ terms represent the steepness of the sides of the curve. The $\zeta$ defines whether ease of intubation improves (+1) or worsens (−1) as the value of the associated variable moves away from $\alpha$. As $\zeta=+1$ for all terms, $\beta_0$ describes the value in logit units that would be produced by the head that is most likely to be difficult to intubate according to the model, as shown in FIG. 8.

When the training data contain such a high prevalence of difficult intubations, it may be suspicious that a model produced from the data might overcall the prevalence of difficult intubation in the general population. However, this concern can be addressed by predicting potential difficult intubation for the average head to which the model had not previously been exposed. In this case, the average head (see FIG. 6) was defined as the head for which all the facial structure variables have zero deviance from the population normal (see Chen et al., supra), and hence for which all the values of x for the facial structure variables in the model are zero. Using a TMD of four fingerbreadths, z=−2.60, and therefore $L(z)$ for the average face is 0.069 which suggests a likelihood of 93.1% that the average head will be easy to intubate.

Discussion

The final prediction model significantly outperformed the combination of MP and TMD evaluations. Specifically, the final prediction model accurately classified 70/80 subjects compared to 47/80 for the combination of MP and TMD evaluations. Furthermore, and unlike previous methods, the prediction model utilized by the present invention was derived from an un-preconditioned set of data derived from computer modeling of subject faces. Specifically, the variables considered for potential inclusion in the prediction model were selected solely on the basis of their discriminatory abilities and not by any a priori assumptions about their relevance. Further still, cross-validation methods minimized the possibility of over-fitting due to the large variable space relative to the number of subjects.

The above systems and methods could be modified to provide an alternate prediction model without departing from the scope of the invention. For example, it is possible that there are causes of difficult intubation that are not included in the above investigation cohorts. As an example, some subjects with limited neck mobility but otherwise normal airways are difficult to intubate (Santoni, B. G. et al. Anesthesiology 2009; 110: 24-31). Conversely, some subjects may present limited neck extension secondary to a systemic disease process (e.g. rheumatoid arthritis) and may demonstrate correlated changes in appearance that may be detectable. It is also possible that deriving the prediction model by using a larger fraction of the difficult airway "space" could provide further refinements. As another example and as briefly described above, the definition of difficult-to-intubate could be modified to exclude all subjects except those that would traditionally be considered very difficult to intubate. Such a change could ultimately provide a different prediction model.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the appended claims.

We claim:

1. A non-transitory computer-readable storage medium having facial structure analysis software code stored therein that, when executed by a processor, causes the processor to perform analysis for predicting potential difficult intubation of a subject including the steps of:
   a) acquiring facial structure data of the subject;
   b) extracting at least one facial structure variable value from the facial structure data;
   c) obtaining a predicted potential-difficult-intubation value by inputting the at least one facial structure variable value into an airway classification model; and
   d) generating a report based on the predicted potential difficult intubation value;
   wherein step b) includes extracting at least three facial structure variable values from the facial structure data, and step c) includes obtaining the predicted potential difficult intubation value by inputting the at least three facial structure variable values into the airway classification model; and
   wherein the at least three facial structure variable values include a face-brow-nose-chin ratio, at least one jaw-neck slope high and low value, and at least one nose-tilt down and up value.

2. The computer-readable storage medium of claim 1, further comprising the step of measuring a thyromental distance of the subject, and wherein step c) includes obtaining the predicted potential difficult intubation value by inputting the at least three facial structure variable values and the thyromental distance into the airway classification model.

3. The computer-readable storage medium of claim 1, wherein the at least one facial structure variable value is an eigenface-transformed variable value.

4. The computer-readable storage medium of claim 1, wherein the predicted potential difficult intubation value is a predicted likelihood of the subject being difficult to intubate.

5. A non-transitory computer-readabe storage medium having facial structure analysis software code stored therein that, when executed by a processor, causes the processor to perform analysis for predicting potential difficult intubation of a subject including the steps of:
   a) acquiring facial structure data of the subject;
   b) extracting at least one facial structure variable value from the facial structure data
   c) obtaining a predicted potential-difficult-intubation value by inputting the at least one facial structure variable value into an airway classification model; and
   d) generating a report based on the predicted potential difficult intubation value;
   wherein the airway classification model is a quadratic logit model defined by the equation:

$$L(z) = \frac{1}{1 + e^{-z}}$$

where $L(z)$ is the predicted potential difficult intubation value, and:

$$z = \beta_0 - \left( \sum_{i=1}^{n} \varsigma_i \frac{(x_i - \alpha_i)^2}{2\sigma_i^2} \right)$$

where n is the number of facial structure variable values extracted from the facial structure data in step b), $x_1$ is the at least one facial structure variable value, $\alpha_i$ represents an apex of a quadratic curve of the quadratic logit model, $\sigma_i$ represents a steepness of sides of the quadratic curve, $\varsigma_i$ is +1 if ease of intubation improves and −1 if ease of intubation worsens as $x_i$, moves away from $\alpha_i$, and $\beta_0$ describes a baseline degree of intubation difficulty.

6. The computer-readable storage medium of claim 1, wherein step a) includes acquiring a plurality of still images including the facial structure data by using an electronic mobile device of the facial structure analysis system.

7. The computer-readable storage medium of claim 6, wherein the plurality of still images includes at least a frontal view of the head and neck of the subject and a profile view of the head and the neck of the subject.

8. The computer-readable storage medium of claim 1, wherein step d) includes generating the report to indicate that the subject is easy-to-intubate if the predicted potential difficult intubation value is at least less than a threshold value and that the subject is difficult-to-intubate if the predicted potential difficult intubation value is greater than the threshold value.

9. The computer-readable storage medium of claim 1, further comprising the step of deriving the airway classification model by evaluating abilities of a plurality of facial structure variables to discriminate between easy-to-intubate subjects and difficult-to-intubate subjects, the plurality of facial structure variables together completely describing a subject's face.

10. The computer-readable storage medium of claim 1, further comprising the step of sending the facial structure data to a remote server over a data network before extracting the at least one facial structure variable value from the facial structure data.

11. A non-transitory computer-readable storage medium having facial structure analysis software code stored therein that, when executed by a processor, causes the processor to perform analysis for predicting potential difficult intubation of a subject including the steps of:
 a) acquiring facial structure data from the subject;
 b) extracting at least three facial structure variable values from the facial structure data, the at least three facial structure variable values including a face-brow-nose-chin ratio, at least one jaw-neck slope high and low value, and at least one nose-tilt down and up value;
 c) measuring a thyromental distance of the subject;
 d) obtaining a predicted potential difficult intubation value by inputting the at least three facial structure variable values and the thyromental distance into an airway classification model; and
 e) generating a report to indicate that the subject is easy-to-intubate if the predicted potential difficult intubation value is at least less than a threshold value and that the subject is difficult-to-intubate if the predicted potential difficult intubation value is greater than the threshold value.

12. The computer-readable storage medium of claim 11, wherein step a) includes acquiring a plurality of still images including the facial structure data by using an electronic mobile device of the facial structure analysis system.

13. The computer-readable storage medium of claim 11, further comprising the step of sending the facial structure data to a remote server over a data network before extracting the at least one facial structure variable value from the facial structure data.

14. The computer-readable storage medium of claim 11, wherein the airway classification model is defined by the equation:

$$L(z) = \frac{1}{1+e^{-z}}$$

where L(z) is the predicted potential difficult intubation value, and:

$$z = \beta_0 - \varsigma_1 \frac{(x_1 - \alpha_1)^2}{2\sigma_1^2} - \varsigma_2 \frac{(x_2 - \alpha_2)^2}{2\sigma_2^2} - \varsigma_3 \frac{(x_3 - \alpha_3)^2}{2\sigma_3^2} - \varsigma_4 \frac{(x_4 - \alpha_4)^2}{2\sigma_4^2}$$

where $x_1$, is the face-brow-nose-chin ratio, $x_2$ is the at least one jaw-neck slope high and low value, $x_3$ is the at least one nose-tilt down and up value, and $x_4$ is the thyromental distance.

15. The computer-readable storage medium of claim 14, wherein:
 $\beta_0 = 10.85$
 $\alpha_1 = 2.995$
 $\sigma_1 = 2.417$
 $\varsigma_1 = 1$
 $\alpha_2 = -13.683$
 $\sigma_2 = 3.255$
 $\varsigma_2 = 1$
 $\alpha_3 = 0.557$
 $\sigma_3 = 0.735$
 $\varsigma_3 = 1$
 $\alpha_4 = 2.032$
 $\sigma_4 = 0.738$
 $\varsigma_4 = 1$.

16. A facial structure analysis system for predicting potential difficult intubation of a subject, comprising a processor configured to execute facial structure analysis software code stored on a non-transitory computer-readable storage medium, the code directing the processor to perform the steps of:
 a) extracting, using the facial structure analysis software code, at least one facial structure variable value from facial structure data of the subject;
 b) obtaining a predicted potential difficult intubation value by inputting the at least one facial structure variable value into an airway classification model;
 c) generating a report based on the predicted potential difficult intubation value;
 wherein step a) includes extracting at least three facial structure variable values from the facial structure data, and step b) includes obtaining the predicted potential difficult intubation value by inputting the at least three facial structure variable values into the airway classification model; and
 wherein the at least three facial structure variable values include a face-brow-nose-chin ratio, at least one jaw-neck slope high and low value, and at least one nose-tilt down and up value.

17. The facial structure analysis system of claim 16, wherein step b) includes obtaining the predicted potential difficult intubation value by inputting the at least one facial structure variable value and a thyromental distance of the subject into the airway classification model.

18. The facial structure analysis system of claim 17, wherein step a) includes extracting the at least one facial structure variable value from a plurality of still images including the facial structure data.

* * * * *

UNITED STATES PATENT AND TRADEMARK OFFICE
CERTIFICATE OF CORRECTION

PATENT NO. : 8,460,215 B2
APPLICATION NO. : 12/795829
DATED : June 11, 2013
INVENTOR(S) : Christopher W. Connor and Scott Segal It is certified that error appears in the above-identified patent and that said Letters Patent is hereby corrected as shown below:

In the Specifications:

Column 2, Line 1, "thyrostemal" should be --thyrosternal--.

Column 8, Line 7, "P>0.1" should be --P≤0.1--.

In the Claims:

Column 14, Claim 5, Line 4, "readabe" should be --readable--.

Signed and Sealed this
Twenty-third Day of July, 2013

Teresa Stanek Rea
*Acting Director of the United States Patent and Trademark Office*